No. 743,867. PATENTED NOV. 10, 1903.
R. M. HEAD.
REVERSIBLY CHANGED SPEED DRIVING MECHANISM.
APPLICATION FILED JULY 5, 1901.
NO MODEL. 3 SHEETS—SHEET 1.

WITNESSES.
M. B. Morton
M. M. Head

INVENTOR
Reuben M. Head.

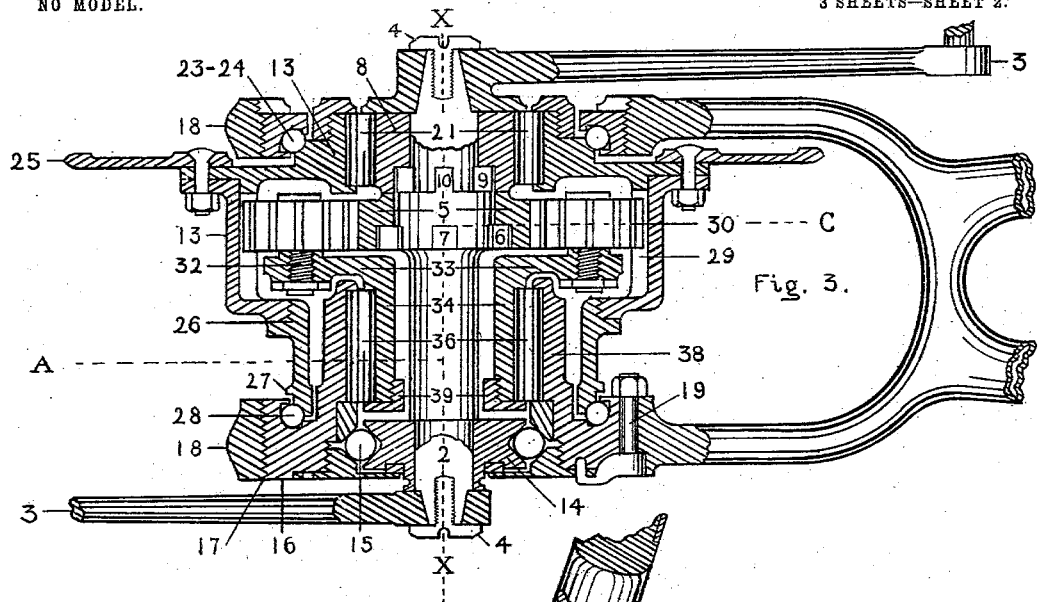
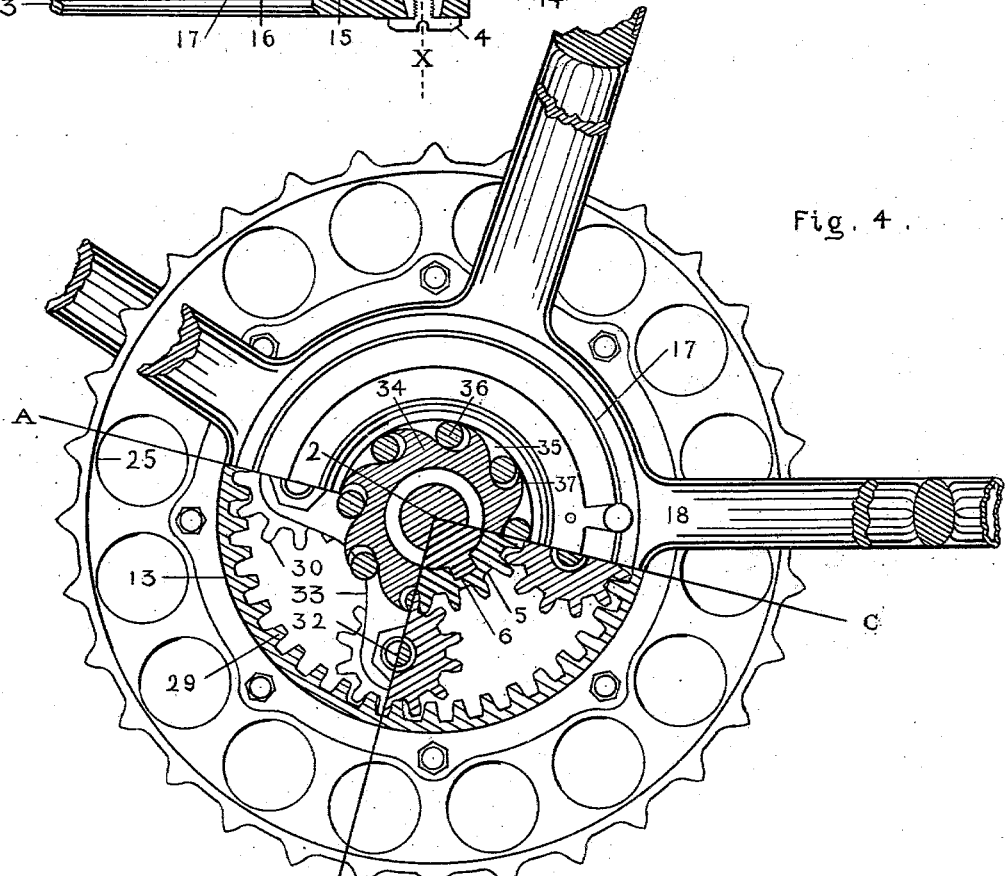

No. 743,867. PATENTED NOV. 10, 1903.
R. M. HEAD.
REVERSIBLY CHANGED SPEED DRIVING MECHANISM.
APPLICATION FILED JULY 5, 1901.
NO MODEL. 3 SHEETS—SHEET 3.
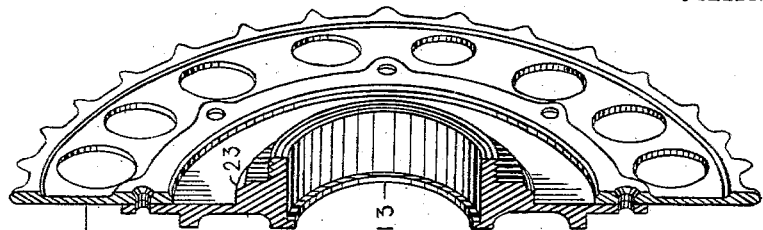
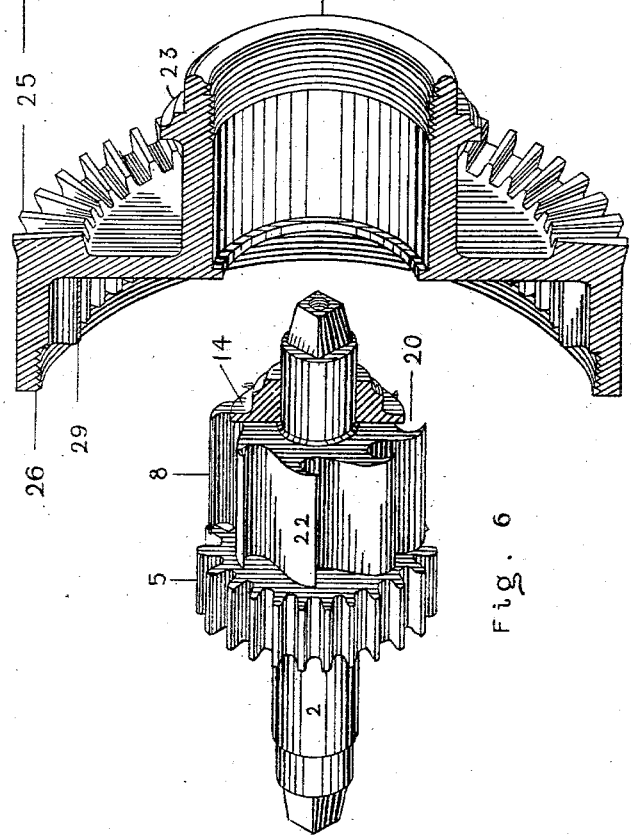
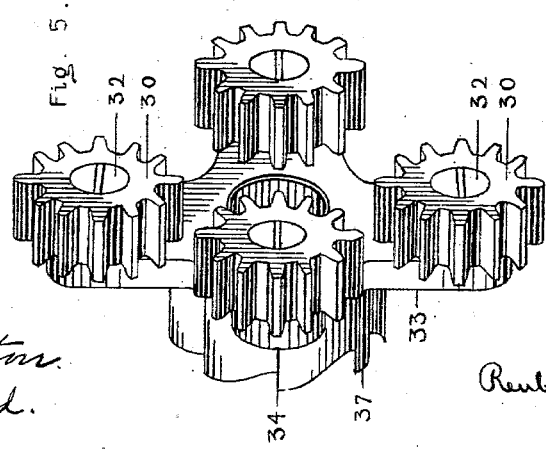
WITNESSES. INVENTOR.

No. 743,867. Patented November 10, 1903.

UNITED STATES PATENT OFFICE.

REUBEN M. HEAD, OF ALLEGHENY, PENNSYLVANIA.

REVERSIBLY-CHANGED-SPEED DRIVING MECHANISM.

SPECIFICATION forming part of Letters Patent No. 743,867, dated November 10, 1903.

Application filed July 5, 1901. Serial No. 67,255. (No model.)

*To all whom it may concern:*

Be it known that I, REUBEN M. HEAD, of the city and county of Allegheny, in the State of Pennsylvania, have invented a new and useful Improvement in Reversibly-Changed-Speed Driving Mechanism, of which improvement the following is a specification.

The object of my improvements is to provide a mechanism whereby the motive power delivered to a secondary wheel or shaft revolving in a fixed unchanging direction may be automatically increased or diminished by merely reversing the direction in which the prime moving shaft, axle, or wheel rotates. It is applicable to bicycles, similarly-propelled vehicles, and to other forms of utilizing or converting mechanical energy. For convenience of illustration, however, I have shown the mechanism as applied to bicycles, and to that end have provided devices by means of which when the rider back-pedals or rotates the cranks in the reverse direction to that commonly used the "gear" of the bicycle, as it is termed, will be decreased and the power correspondingly increased, so that a high driving-gear may be employed, while at the same time the gear may be automatically diminished by merely revolving the cranks in the opposite or reverse direction without recourse to any extraneous mechanism operated by hand from the top rail or handle-bar.

Figure 1:
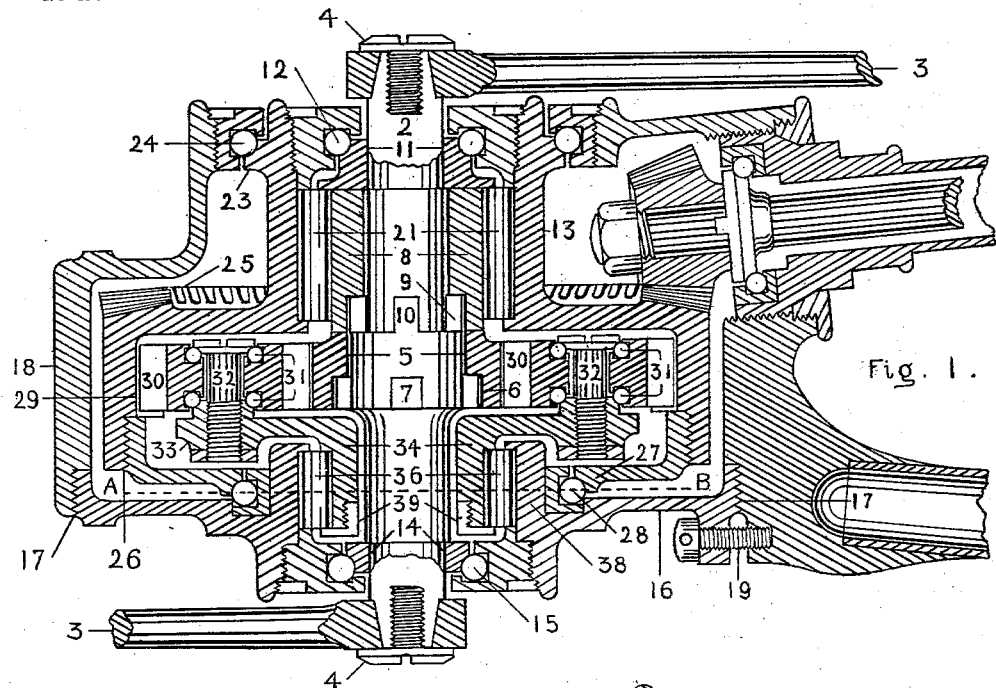
Figure 2:
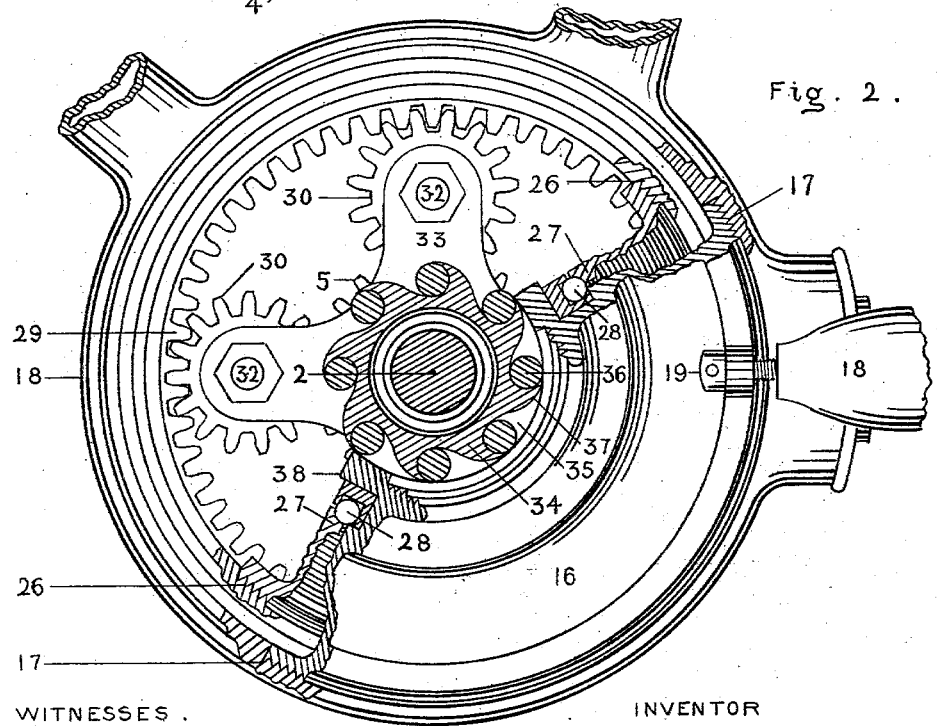

Referring to the accompanying drawings, which illustrate this specification, Figure 1 is a sectional plan of the mechanism as applied to bicycles of the bevel-gear-wheel class. Fig. 2 is a side elevation, partially in section, through the mechanism upon the line A B shown in Fig. 1, a portion of the face-plate and of an inner plate being removed to facilitate the illustration. Fig. 3 is a sectional plan of the mechanism as applied to bicycles of the sprocket-wheel class. Fig. 4 is a side elevation, partially in section, through segments bounded by the radial lines A X B and B X C as they diverge from their common axial line X X shown in Fig. 3. Figs. 5, 6, 7, and 8 are detail views, partially in section and in perspective, of the more important portions of the foregoing mechanism.

In the before-mentioned figures like symbols of reference indicate like parts or parts performing a similar office wherever they occur.

Referring to the same, 2 represents a crank-axle having cranks 3 3, secured thereto by the flat-headed tap-bolts 4 4. A spur-wheel 5, secured by interfitting slots 6 and lugs 7 upon the crank-axle, has a slight shoulder formed upon its side, which bears against a similar shoulder formed upon an adjacent roller-clutch disk 8, secured by interfitting slots 9 and lugs 10 upon the crank-axle and held thereto by the coned sleeve-nut 11, which rotates upon a ball-bearing 12, secured to a revolving drum 13. A somewhat similar coned sleeve-nut 14 is placed upon the other extremity of the crank-axle, which rotates upon a ball-bearing 15, secured to the face-plate 16, which is joined by interfitting screw-threads 17 to the hollow hub or crank-hanger 18 and locked thereto by the key-bolt 19.

The clutch-disk 8 is formed with curvilinear recesses 20 to receive the clutch-rollers 21 and is also formed with projections 22, whose curvilinear surfaces are so inclined that in the forward and downward revolution of the crank-axle the clutch-rollers 21 will be forced into locking engagement with the annular surface of the revolving drum 13, which is formed with a coned seat 23 and rotates upon a ball-bearing 24, secured to the hollow hub or crank-hanger 18.

The revolving drum 13 carries the main driving-wheel 25, from which the power is delivered, and for convenience of assembling and dismounting the parts is made separable, as shown, the lateral extension of the same, secured by the interfitting screw-threads 26, having a coned seat 27, which rotates upon a ball-bearing 28, secured to the face-plate 16. The drum 13 is formed with an internal gear-wheel 29, whose teeth are engaged by the pinion-wheels 30, which in turn engage with the spur-wheel 5 upon the crank-axle.

The pinion-wheels 30 have ball-bearings 31 rotating upon the coned studs and stud-bolts 32 securely fastened to a spanner or carrier 33, formed with a perforated hub or clutch-disk 34, having curvilinear recesses 35, adapted to receive the clutch-rollers 36, and provided with projections 37, whose curvilinear surfaces are inclined in opposition to those of the clutch-disk 8 upon the crank-axle, so that when the clutch-rollers 21 of the latter are in locking engagement with the revolving drum 13, carrying the main driving-wheel, as hereinbefore described, the clutch-rollers 36 of the spanner-clutch 34 will be free to rotate upon the annular surface of the fixed collar 38, or vice versa. The collar 38 forms a rigid portion of the face-plate 18, which is securely held from rotation by the locking device described.

The clutch-rollers are restrained from lateral movement by slight shoulders, shown upon the revolving drum and collar, and by the shouldered extension of the bearings 12 and 15 and of the sleeve-nut 11. The proper centering of the spanner or carrier clutch-disk is secured by the slight shoulder shown thereon and by the cap or check-ring 39 joined thereto.

In the form of Fig. 3, which shows the mechanism as applied to sprocket-wheel and chain transmission, the lateral thrust of the crank-axle is taken by the "four-point" ball-bearing 15, which renders the construction more simple and compact, aiding also in the horizontal alinement of the sprocket-wheels.

In consequence of the alternate action of the clutches, as herein stated, a forward and downward pressure applied to the cranks will force the clutch-rollers 21 into the narrower confines of the recesses 20, and the jamming action incident thereto will lock the crank-axle clutch 8 to the revolving drum 13, whereupon the main driving-wheel will be directly driven. The spanner or carrier 33 and the pinion-wheels 30 pivoted thereto revolve bodily therewith upon the clutch-rollers 36, which, subsiding into the deeper portions of the recesses 35, rotate against the annular surface of the fixed collar 38, as shown in Fig. 2. When, however, in ascending or descending a hill or whenever desired backward and downward pressure is applied to the cranks, the clutch-rollers 21 subside into the deeper portions of the recesses 20 and rotate upon the annular surface of the drum 15. Simultaneous with this movement the clutch-rollers 36 will be forced into locking engagement with the fixed collar 38, as shown in Fig. 4, whereupon the power delivered by the cranks to the spur-wheel 5 will pass through the pinion-wheels 30, using the coned stud-bolts 32 of the spanner or carrier 33 as a fixed fulcrum or pivot to the internal gear-wheel 29, which in this backward and downward movement of the cranks continues the forward revolution of the main driving-wheel unchanged as to its direction of rotation, but at a diminished speed, however, and consequent increase of power in the same relative proportion as the teeth of the spur-wheel are in number to those of the internal gear-wheel.

I do not limit myself to the construction herewith illustrated, since it is obvious that ball-clutches or other form of clutch mechanism can readily be utilized in lieu of the roller-clutches shown in the drawings hereto attached.

Having thus described my invention, what I claim, and desire to secure by Letters Patent, is—

1. In a reversibly-changed-speed driving mechanism, the combination of a prime moving shaft with an inclosing wheel from which power may be transmitted, a spur-gear mounted on said shaft, gear-wheels meshing with said spur-gear, and roller-clutches, whose members are alternately engaged and disengaged by a change or reversal of their rotative direction, substantially as shown and described for the purpose specified.

2. In a reversibly-changed-speed driving mechanism, the combination of a shaft, an inclosing wheel, two clutch members one of which engages the inclosing wheel, an internal gear-wheel forming part of said inclosing wheel, a spanner forming part of one of the clutch members, pinions pivoted on such spanner and meshing with the internal gear, a spur-wheel on the shaft which wheel also engages the pinions, the face-plate with which one of the clutch members is formed integrally, a locking device, and the hollow hub to which the face-plate is secured by said device, substantially as described.

In testimony whereof I have hereunto signed my name to this specification in the presence of two subscribing witnesses.

REUBEN M. HEAD.

Witnesses:
 ALBERT J. GOULD,
 HAROLD W. WATKINS.